(12) United States Patent
Kotsubo et al.

(10) Patent No.: US 7,438,978 B2
(45) Date of Patent: Oct. 21, 2008

(54) TRANSPARENT CONDUCTIVE FILM, TRANSPARENT CONDUCTIVE PLATE, AND TOUCH PANEL

(75) Inventors: Hidefumi Kotsubo, Kodaira (JP); Masato Yoshikawa, Kodaira (JP); Yasuhiro Morimura, Kodaira (JP); Kiyomi Sasaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/194,848

(22) Filed: Aug. 2, 2005

(65) Prior Publication Data

US 2006/0008665 A1    Jan. 12, 2006

(30) Foreign Application Priority Data

Feb. 3, 2003   (JP) .............................. 2003-026284

(51) Int. Cl.
*B32B 7/12* (2006.01)
*B32B 18/00* (2006.01)
*B32B 27/06* (2006.01)
*B32B 27/30* (2006.01)
*B32B 27/36* (2006.01)

(52) U.S. Cl. ........................ 428/483; 428/457; 428/458; 428/469; 428/480; 428/522; 526/319; 526/328; 526/329.7; 257/431; 257/449; 257/E31.124; 257/E31.126; 257/E33.064; 345/173; 178/18.01

(58) Field of Classification Search ........................ None
See application file for complete search history.

(56) References Cited

U.S. PATENT DOCUMENTS

| | | | | |
|---|---|---|---|---|
| 5,208,110 A | * | 5/1993 | Smith et al. ................. | 428/414 |
| 5,310,835 A | * | 5/1994 | Skoultchi et al. ............ | 526/198 |
| 5,448,037 A | * | 9/1995 | Takase et al. ................ | 219/547 |
| 5,493,102 A | * | 2/1996 | Takase et al. ................ | 219/547 |
| 6,372,074 B1 | * | 4/2002 | Holguin et al. ............. | 156/234 |
| 6,411,344 B2 | * | 6/2002 | Fujii et al. ..................... | 349/12 |
| 6,495,253 B1 | * | 12/2002 | Koyama et al. ............. | 428/343 |
| 6,506,090 B2 | * | 1/2003 | Kotsubo et al. ............... | 445/49 |
| 6,549,195 B2 | * | 4/2003 | Hikida et al. ............... | 345/173 |
| 6,590,622 B1 | * | 7/2003 | Nakanishi et al. ............ | 349/12 |
| 6,603,085 B2 | * | 8/2003 | Oya et al. .................... | 200/512 |

(Continued)

FOREIGN PATENT DOCUMENTS

JP    2-066809 A    3/1990

(Continued)

*Primary Examiner*—Vivian Chen
(74) *Attorney, Agent, or Firm*—Sughrue Mion, PLLC

(57) ABSTRACT

A touch panel having excellent durability, in which depression is scarcely generated on the surface of the touch panel by pushing the surface with a pen, and a transparent conductive film and plate useful in the touch panel are provided. The transparent conductive film comprises a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film, wherein work of the adhesive layer in elastic deformation is not less than 60%. The transparent conductive plate is provided with the adhesive layer, the touch panel is provided with the transparent conductive film or plate as an upper or lower electrode.

18 Claims, 3 Drawing Sheets

U.S. PATENT DOCUMENTS

| | | | |
|---|---|---|---|
| 6,629,833 B1 * | 10/2003 | Ohya et al. | 425/458 |
| 6,649,260 B2 * | 11/2003 | Kumano et al. | 428/343 |
| 6,689,458 B1 * | 2/2004 | Mikoshiba et al. | 428/339 |
| 6,707,450 B2 * | 3/2004 | Ahn et al. | 345/173 |
| 6,720,955 B2 * | 4/2004 | Sugawara et al. | 345/173 |
| 6,727,566 B1 * | 4/2004 | Fukui et al. | 257/437 |
| 6,781,642 B2 * | 8/2004 | Nakanishi et al. | 349/12 |
| 6,797,210 B2 * | 9/2004 | Iijima | 264/112 |
| 6,896,981 B2 * | 5/2005 | Iwabuchi et al. | 428/698 |
| 6,903,729 B2 * | 6/2005 | Nakanishi et al. | 345/173 |
| 6,908,671 B2 * | 6/2005 | Hosokawa et al. | 428/355 AC |
| 6,939,911 B2 * | 9/2005 | Tosaki et al. | 524/522 |
| 6,987,354 B2 * | 1/2006 | Arakawa et al. | 313/506 |
| 7,190,354 B2 * | 3/2007 | Tanaka et al. | 345/173 |
| 2002/0039004 A1 * | 4/2002 | Kotsubo et al. | 313/582 |
| 2002/0130849 A1 * | 9/2002 | Ahn et al. | 345/173 |
| 2003/0087119 A1 * | 5/2003 | Iwabuchi et al. | 428/633 |
| 2003/0176124 A1 * | 9/2003 | Koike et al. | 442/16 |
| 2004/0028919 A1 * | 2/2004 | Yamamoto et al. | 428/458 |
| 2004/0033735 A1 * | 2/2004 | Takada et al. | 439/894 |
| 2004/0137222 A1 * | 7/2004 | Welke et al. | 428/343 |
| 2004/0263481 A1 * | 12/2004 | Nishikawa et al. | 345/173 |
| 2004/0265602 A1 * | 12/2004 | Kobayashi et al. | 428/458 |
| 2006/0003188 A1 * | 1/2006 | Ohno et al. | 428/701 |

FOREIGN PATENT DOCUMENTS

| | | | |
|---|---|---|---|
| JP | 2-066811 A | | 3/1990 |
| JP | 2-129808 A | | 5/1990 |
| JP | 08-148036 | * | 6/1996 |
| JP | 2000-182473 A | | 6/2000 |
| JP | 2001-332132 | * | 11/2001 |
| JP | 2001-332132 A | | 11/2001 |
| JP | 2002-073282 | * | 3/2002 |
| JP | 2002-103504 | * | 4/2002 |
| JP | 2002-245858 | * | 8/2002 |
| JP | 2002-245858 A | | 8/2002 |
| JP | 2003-151356 | * | 5/2003 |
| JP | 2003-151356 A | | 5/2003 |
| JP | 2003-151357 | * | 5/2003 |
| JP | 2003-151357 A | | 5/2003 |

* cited by examiner

TRANSPARENT CONDUCTIVE FILM, TRANSPARENT CONDUCTIVE PLATE, AND TOUCH PANEL

BACKGROUND OF INVENTION

1. Field of the Invention

The present invention relates to a touch panel, and a transparent (electrically) conductive film having a polymer film and a transparent conductive thin layer provided thereon and a transparent (electrically) conductive plate having a transparent substrate and a transparent conductive thin layer provided thereon which are advantageously useable in the touch panel.

2. Description of the Related Art

A touch panel according to resistance sensitive system, in which signals are inputted by pushing a surface of a display such as CRT or LCD with a fingertip or by drawing the surface with pen, has been used so far. The touch panel is widely used in input operating parts with which an ATM (automatic teller machines) or CD (cash dispenser) in a bank, a vending machine for thicket, a personal digital assistance, a personal computer and various industrial equipments are provided.

The touch panel according to resistance sensitive system has a structure that an upper electrode comprising a polymer base film, an undercoat layer and a transparent conductive thin layer superposed in this order is bonded on a lower electrode comprising a plastic or glass thick plate and a transparent electrode formed thereon through spacers (microdot spacers), such that the transparent conductive thin layer and transparent electrode face with each other. When a display surface of the upper electrode is pushed with a fingertip or pen, the surface comes in contact with an opposite electrode to turn on electricity, which brings about input of signals. Generally, a hard coat layer is formed on the surface of the upper electrode to protect the polymer base film.

JA02-66809 describes a laminated material of a substrate, an adhesive layer, a substrate and a transparent conductive layer, in which the adhesive layer serves to relax the stress applied to the transparent conductive layer.

SUMMARY OF THE INVENTION

In the bonded material described in JA02-66809, materials such as polyurethane and rubber which have elastic modulus of $1\times10^5$ to $1\times10^7$ dyne/cm² ($1\times10^4$ to $1\times10^6$ Pa) are used as an adhesive of the adhesive layer. According to the study of the present inventors, the adhesive layer is apt to plastically deform, and therefore when a surface of the touch panel is pushed with a pen, the surface is depressed and the depressed shape is not easily returned to the original shape, which gives the surface of the touch panel the poor appearance. Further since the adhesive layer comprises a pressure-sensitive adhesive capable of sticking mainly by application of pressure, the adhesive layer occasionally reduces in its adhesive strength or suffers from occurrence of bubbling or peeling under a severe environment. For instance, when the surface of the upper electrode of the laminated material is repeatedly inputted with the pen or fingertip, the transparent electrode is occasionally subject to its cracking or to its peeling or dropout (exfoliation) from the polymer film with the passage of time. These damages deteriorate the electric characteristics such as uniform electric resistivity, which does not bring about excellent durability.

The object of the present invention is to provide a touch panel having excellent durability, in which the above-mentioned problems are solved and in which depression (indentation) is scarcely generated on the surface by pushing the surface of the touch panel with a pen, and in which there are no occurrences of the peeling between the polymer film and the adhesive layer and of the damage of the transparent conductive thin layer.

Further the object of the present invention is to provide a transparent conductive film useful in the touch panel.

Furthermore the object of the present invention is to provide a transparent conductive plate useful in the touch panel.

The study of the inventors reveals the following matters: An adhesive layer having the property that depression is scarcely left on the surface of the touch panel after pushing the surface of the touch panel with a pen also has the property that depression of the surface generated by pushing the surface of the touch panel with a pen easily returns to its original shape. Further, such an adhesive layer shows good feeling on the use and excellent adhesive property. In more detail, when the adhesive layer is too hard, it shows poor feeling on the use and poor adhesive property. In contrast when the adhesive layer is too soft, it easily generates depression of the surface and does not have satisfactory durability. The present inventors have studied the above problems thoroughly and consequently found that the adhesive layer is required to have high work in elastic deformation (different from elastic modulus) to resolve the above problems, and thus has attained to the present invention.

The present invention is provided by a transparent conductive film comprising a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film, wherein work of the adhesive layer in elastic deformation is not less than 60%.

As for "work in elastic deformation":

The work in elastic deformation of the present invention is a value determined according to "A8 Plastic and elastic parts of the indentation relaxation" in ISO14577:2002(E). This method is also described in DIN 50359-1:1997-10.

The plastic and elastic parts of the indentation work is determined in the following manner:

During the indentation procedure (for example the test described later), the mechanical work $W_{total}$ is only partly consumed as plastic deformation work $W_{plast}$. During the removal of the test force, the remaining part is set free as work of the elastic reverse deformation $W_{elast}$. According to the definition of the mechanical work as $W=\int Fdh$ (F: force, h: invasion depth (depressed depth)), both parts appear as different areas in FIG. 1. The relation:

$$\eta_{IT} = W_{elast}/W_{total} \times 100 \quad \text{(elastic part)}$$

contains information which is suitable for characterization of the test piece where $$W_{total} = W_{elast} + W_{plast}$$

The plastic part $W_{elast}/W_{total}$ follows as $$100\% - \eta_{IT}$$

The work in elastic deformation of the present invention corresponds to the elastic part.

The elastic part (the work in elastic deformation) is determined by the indentation test which is carried out, using Fischer Scope H100 available from Helmut Fischer Company, under the conditions of the force (load) of 3.0 mN to the test film, the time of 10 sec. for application of the force, and the time for removal of the force of 10 sec. after the application of the force. As a penetrator of the Fischer Scope H100, a Vickers pyramid indenter having precise dimension is generally used.

In the transparent conductive film of the invention, the adhesive layer is preferably a film formed by curing a compound having an ester group. The curing of the compound having an ester group is preferably carried out by application of light or heat. The compound having ester group generally comprises at least one of (meth)acrylate monomer. The compound having ester group preferably comprises at least one of (meth)acrylate oligomer and at least one of (meth)acrylate monomer. It is particularly preferred to comprise both of the oligomer and monomer. Further the adhesive layer can contain a thermoplastic elastomer, if desired.

The transparent conductive film satisfying the above preferred embodiments, is apt to have the work in elastic deformation of not less than 60%. The compound having ester group generally further comprises a photosensitive initiator for the light curing, or an organic peroxide for the heat curing.

The adhesive layer preferably has elastic modulus of $1 \times 10^5$ to $1 \times 10^7$ Pa. The work of the adhesive layer in elastic deformation is preferably not less than 80%. Thus, the extent of the indentation can be extremely reduced.

The first and second polymer films preferably comprise polyethylene terephthalate in view of transparent property.

The transparent conductive layer preferably comprises at least one compound selected from indium oxide, tin oxide, zinc oxide, indium-doped tin oxide (ITO), antimony-doped tin oxide (ATO) and aluminum doped zinc oxide, in view of transparent and conductive properties.

An undercoat layer is preferably provided between the first polymer film and the transparent conductive thin layer, whereby the adhesion property to the transparent conductive thin layer can be enhanced.

A protective layer is preferably provided on the transparent conductive thin layer.

The invention is further provided by a transparent conductive plate comprising a transparent substrate and a polymer film having a transparent conductive thin layer thereon, the transparent substrate and the polymer film being bonded each other through an adhesive layer such that a surface of the transparent substrate faces a surface having no transparent conductive thin layer of the polymer film, wherein work of the adhesive layer in elastic deformation is not less than 60%.

Even if the transparent conductive plate is not used in the touch panel, the use of the transparent conductive plate brings about reduction of the depression (indentation) caused by a pen due to the indirect relaxation of the depressing of the pane.

The preferred embodiments of the adhesive layer in the transparent conductive film can be applied to the transparent conductive plate.

The polymer films preferably comprise polyethylene terephthalate in view of transparent property. The transparent substrate is a glass plate or a plastic plate such as an acrylic resin (especially polymethyl methacrylate) plate or polycarbonate plate.

Moreover, the invention is provided by a touch panel comprising:

an upper electrode comprising a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film, and a lower electrode comprising a transparent substrate and a polymer film having a transparent conductive thin layer thereon, the transparent substrate and the polymer film being bonded each other through an adhesive layer such that a surface of the transparent substrate faces a surface having no transparent conductive thin layer of the polymer film, the upper and lower electrodes being bonded each other through spacers such that both of the transparent conductive thin layers face each other, wherein the upper electrode is the transparent conductive film as defined above.

Furthermore, the invention is provided by a touch panel comprising:

an upper electrode comprising a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film, and a lower electrode comprising a transparent substrate and a polymer film having a transparent conductive thin layer thereon, the transparent substrate and the polymer film being bonded each other through an adhesive layer such that a surface of the transparent substrate faces a surface having no transparent conductive thin layer of the polymer film, the upper and lower electrodes being bonded each other through spacers such that both of the transparent conductive thin layers face each other, wherein the lower electrode is the transparent conductive plate as defined above.

DETAILED DESCRIPTION OF THE INVENTION

Embodiments of the invention are explained in detail by referring to drawings.

Figure 2:
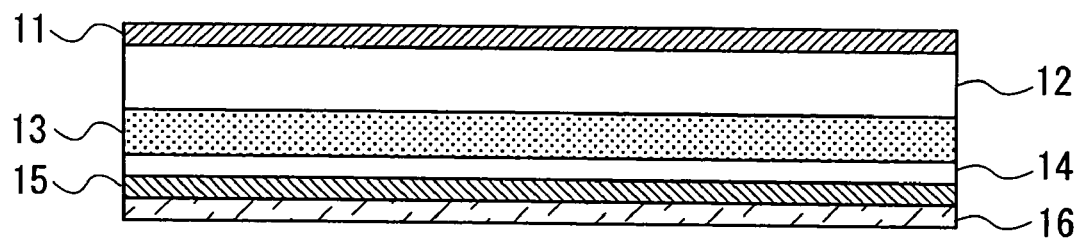
FIG. 2 is a section view showing an example of the transparent conductive film according to the present invention.

FIG. 2 is a section view showing an example of the transparent conductive film of the present invention.

In the transparent conductive film of the invention, a second polymer film 12 having a hardcoat layer 11 thereon and a first polymer film 14 having a transparent conductive thin layer 16 thereon through an undercoat layer 15 are bonded together other through an adhesive layer 13 such that the reverse surfaces (sides having no the layers) faces with each other. The adhesive layer 13 of the invention has work in elastic deformation of not less than 60%. In more detail, by the use of the adhesive layer, the depression is scarcely generated on the surface of the touch panel when the surface is pushed with a pen or the like, and even if the depression is generated on the surface, the depression is immediately returned to the original shape. The adhesive layer brings about good feeling on the use and excellent adhesion property.

The specific work of the adhesive layer in elastic deformation can be easily obtained by curing the appropriate combination (mixture) of at least one of (meth)acrylate oligomer and at least one of (meth)acrylate monomer, and further enhanced by using a more preferable combination. It is also effective to combine the (meth)acrylate oligomer and/or the (meth)acrylate monomer with a thermoplastic elastomer. Further a protective layer may be formed on a surface of the transparent conductive thin film.

Figure 3:
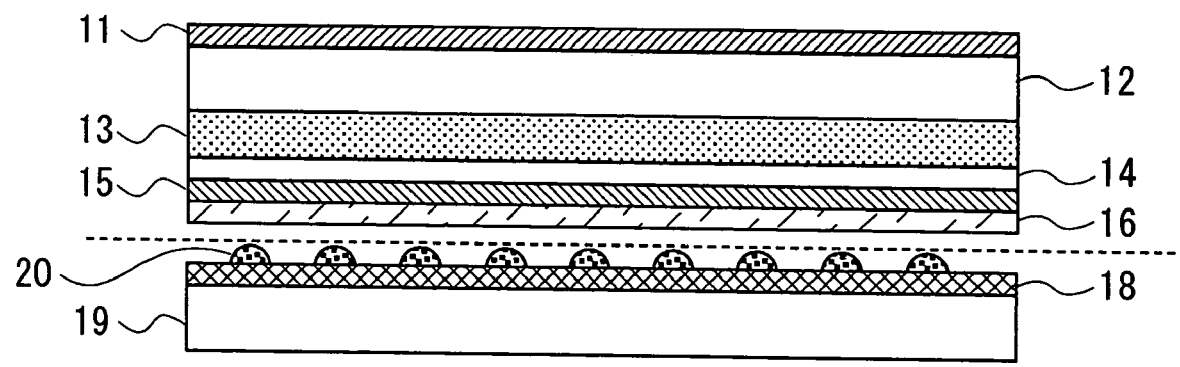
FIG. 3 is a section view showing an example of the touch panel in which the transparent conductive film of the invention is used as the upper electrode.

FIG. 3 is a section view showing an example of the touch panel in which the transparent conductive film of the invention is used as the upper electrode. In FIG. 3, the transparent conductive film showed in FIG. 2 is used as an upper electrode, and this upper electrode and a lower electrode comprising a transparent substrate 19 and a transparent conductive thin layer 18 thereon and microdot spacers 20 provided on the conductive thin layer are bonded each other such that both the transparent conductive thin layers face with each other, whereby the touch panel is constructed. As shown in FIG. 3, the adhesive layer 13 suppressing occurrence of the depression and having excellent adhesive property is used and hence the touch panel is improved in appearance and durability.

When the touch panel is inputted by pushing the surface with a pen or fingertip, the upper electrode receives a larger force than the lower electrode to deform itself. In case the deformation, i.e., depression remains on the surface, the depression brings about poor appearance of the upper electrode or the touch panel, or the force (load) giving the depression is apt to cause dropout or peeling of the transparent conductive thin layer. The provision of the adhesive layer of the invention effectively prevents the poor appearance and relaxes the force, and therefore the force scarcely reduces the adhesion property between the adhesive layer and the polymer film or the transparent plastic substrate. Thus, the adhesive layer of the invention does not bring about occurrence of the depression due to the above-mentioned relax effect, and maintains the adhesion property between the adhesive layer and the polymer film. Hence, the touch panel of the invention having as the upper electrode the transparent conductive thin film provided with the adhesive layer shows good appearance for a long time period and does not suffer from the dropout or peeling of the conductive thin layer and the delamination, which brings about excellent durability.

Figure 4:
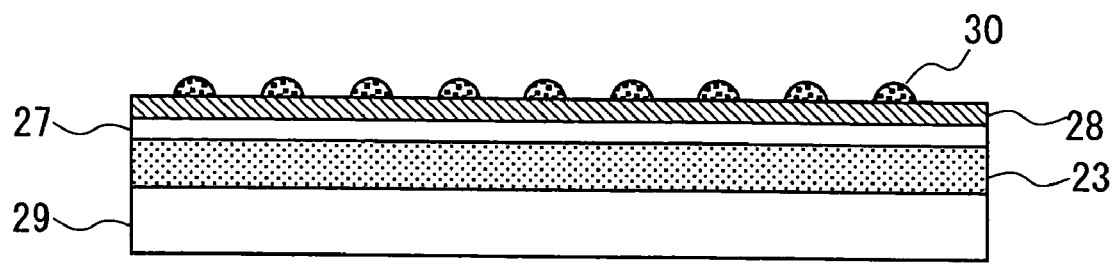
FIG. 4 is a section view showing an example of the transparent conductive plate according to the present invention.

FIG. 4 is a section view showing an example of the transparent conductive plate of the present invention.

In the transparent conductive plate of the invention, a polymer film 27 having a transparent conductive thin layer 28 thereon is provided on a transparent substrate 29 through an adhesive layer 23. On the transparent conductive thin layer 28, microdot spacers 30 are generally provided. The microdot spacers are necessary in lamination of this plate and the upper electrode for preparation of the touch panel. The adhesive layer 28 of the invention has work in elastic deformation of not less than 60%. In more detail, by the use of the adhesive layer, the depression is scarcely generated on the surface of the touch panel when the surface is pushed with a pen or the like, and even if the depression is generated on the surface, the depression is immediately returned to the original shape. In case the adhesive layer is also used in the lower electrode, it brings about good feeling on the use and excellent adhesion property.

The specific work of the adhesive layer in elastic deformation can be easily obtained by curing the appropriate combination (mixture) of at least one of (meth)acrylate oligomer and at least one of (meth)acrylate monomer, and further enhanced by using a more preferable combination. It is also effective to combine the (meth)acrylate oligomer and/or the (meth)acrylate monomer with a thermoplastic elastomer. Further a protective layer may be formed on a surface of the transparent conductive thin film.

Figure 5:
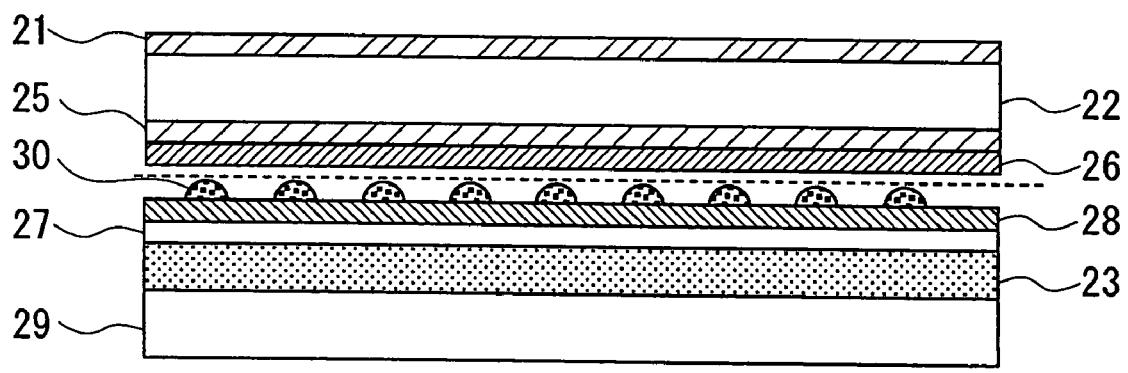
FIG. 5 is a section view showing an example of the touch panel in which the transparent conductive plate of the invention is used as the lower electrodes.

FIG. 5 is a section view showing an example of the touch panel in which the transparent conductive plate of the invention is used as the lower electrode. In FIG. 5, the transparent conductive plate showed in FIG. 4 is used as the lower electrode, and this lower electrode and an upper electrode comprising a polymer film 22 having a hardcoat layer 21 on its one side and a transparent conductive thin layer 26 on its other side through an undercoat layer 25 are bonded each other such that both the transparent conductive thin layers face with each other, whereby the touch panel is constructed.

As shown in FIG. 5, the adhesive layer 23 having the relaxation effect of the force by pushing of a pen or the like and hence the effect suppressing occurrence of depression by the pushing, and having excellent adhesive property is employed and therefore the touch panel is improved in appearance and durability.

As shown in FIG. 3 or 5, the touch panel has the adhesive layer on either upper or lower electrode. However, the adhesive layer is naturally provided on both the upper and lower electrodes.

In the invention, examples of materials of the first and second polymer films 12, 14, and the polymer films 22, 27 include polyester such as polyethylene terephthalate (PET) and polybutylene terephthalate, acrylic resin such as polymethyl methacrylate (PMMA), polycarbonate (PC), polystyrene, cellulose triacetate (TAC), polyvinyl alcohol, polyvinyl chloride, polyvinylidene chloride, polyethylene, ethylene-vinyl acetate copolymer, polyvinyl butyral, metal ion-crosslinked polyethylene, copolymer of methacrylic acid, polyurethane and cellophane. Preferred are PET, PC, PMMA and TAC, especially PET, in terms of the toughness.

A thickness of the first and second polymer films 12, 14, though depending upon the use of the transparent conductive film, are generally in the range of 13 μm to 0.5 mm in the case of using as the upper electrode of touch panel. When the film has the thickness of less than 13 μm, the upper electrode having the film does not show sufficient durability. When the film has the thickness of more than 0.5 mm, the resultant touch panel has increased thickness per se to injure the flexibility.

The thickness of the second polymer film is set to be smaller than that of the first polymer film, and generally in the range of 13 μm to 0.2 mm. The polymer films 22, 27 are also set in the same manner as above.

The transparent substrate 19, 29 of the invention is generally a glass plate or plastic plate. Examples of materials of the plastic plate include acrylic resin such as polymethyl methacrylate (PMMA), polycarbonate (PC), polystyrene, polyolefin resin or amorphous polyolefin resin. The thickness of the transparent substrate is generally in the range of 50 μm to 0.5 mm.

Examples of the transparent conductive thin layer 16, 18, 26, 28 provided on the polymer film 14, 22 and transparent substrate 19, 29 include transparent conductive thin layers formed from the oxides such as tin oxide ($SnO_2$), zinc oxide (ZnO), indium-doped tin oxide (ITO), antimony-doped tin oxide (ATO) and aluminum-doped zinc oxide, in view of transparent and conductive properties. Especially preferred is ITO.

When a thickness of the transparent conductive thin layer 16, 18, 26, 28 is too small, the layer cannot have sufficient-conductivity. When the thickness is too large, the transparent conductive thin layer cannot have enhanced conductivity corresponding to the extent of the increased thickness and suffers from increased cost for forming film, and consequently the transparent conductive film comes to have increased thickness per se. Thus, the thickness of the transparent conductive thin layer preferably is in the range of 1 to 500 nm, especially 5 to 100 nm.

Though the transparent conductive layer can be formed according to a conventional process, it is preferred to form the layer by a sputtering process.

In the transparent conductive film of the invention, the second polymer film having the hardcoat layer is bonded to a reverse side of the first polymer film having the transparent conductive thin layer through the adhesive layer of the invention. Further, in the invention, the polymer film having the transparent conductive thin layer is bonded to the surface of the transparent substrate through the adhesive layer of the invention.

The adhesive layer of the invention has work in elastic deformation of not less than 60%, preferably not less than 70%, especially not less than 80%. The work in elastic deformation is described previously. Further the adhesive layer preferably has elastic modulus of $1 \times 10^5$ to $1 \times 10^7$ Pa. In more detail, the adhesive layer especially preferably has both the work in elastic deformation and the elastic modulus, whereby the property suppressing occurrence of the depression and the adhesion property can be enhanced.

The adhesive layer of the invention preferably is a cured layer formed by curing a compound having an ester group. The curing of the compound having an ester group is preferably carried out by application of light or heat. It is especially preferred to three-dimensionally cure the compound.

The compound having ester group preferably is a mixture comprising at least one of (meth)acrylate oligomer and at least one of (meth)acrylate monomer. Only (meth)acrylate oligomer or (meth)acrylate monomer may be employed.

Examples of the (meth)acrylate oligomers (i.e., acrylate oligomers and methacrylate oligomers) include urethane (meth)acrylate, epoxy (meth)acrylate, polyester (meth)acrylate, and acrylic resin (meth)acrylate. Preferred are urethane (meth)acrylate, epoxy (meth)acrylate and polyester (meth)acrylate. In the invention, a mixture of acrylate oligomer and methacrylate oligomer, or acrylate methacrylate oligomer can be emplyed.

Examples of urethane (meth)acrylate include:

compounds obtained by reaction among the following polyol compound and the following organic polyisocyanate compound and the following hydroxyl-containing (meth) acrylate:

examples of the polyol compound include polyol such as ethylene glycol, propylene glycol, neopentyl glycol, 1,6-hexanediol, 3-methyl-1,5-pentanediol, 1,9-nonanediol, 2-ethyl-2-butyl-1,3-propanediol, trimethylolpropane, diethylene glycol, dipropylene glycol, polypropylene glycol, 1,4-dimethylolcyclohexane, bisphenol-A polyethoxydiol and polytetramethylene glycol; polyesterpolyol obtained by reaction of the above-mentioned polyol with polybasic acid or anhydride thereof such as succinic acid, maleic acid, itaconic acid, adipic acid, hydrogenated dimer acid, phthalic acid, isophthalic acid and terephthalic acid; polycaprolactone polyol obtained by reaction of the above-mentioned polyol with ε-caprolactone; a compound obtained by reaction of the above-mentioned polyol with a reaction product of the above-mentioned polybasic acid or anhydride thereof and ε-caprolactone; polycarbonate polyol; or polymer polyol, and examples of the organic polyisocyanate compound include tolylene diisocyanate, isophorone diisocyanate, xylylene diisocyanate, diphenylmethane-4,4'-diisocyanate, dicyclopentanyl diisocyanate, hexamethylene diisocyanate, 2,4,4'-trimethylhexamethylene diisocyanate, 2,2',4-trimethylhexamethylene diisocyanate), and examples of the hydroxyl-containing (meth)acrylate include 2-hydroxyethyl (meth)acrylate, 2-hydroxyropyl (meth)acrylate, 4-hydroxybutyl (meth)acrylate, 2-hydroxy-3-phenyloxypropyl (meth)acrylate, cyclohexane-1,4-dimethylolmono(meth)acrylate, pentaerythritol tri(meth)acrylate or glycerol di(meth)acrylate).

Further, examples of epoxy (meth)acrylate include:

bisphenol-type epoxy(meth)acrylate obtained by reaction of bisphenol-type epoxy resin such as bisphenol-A epoxy resin or bisphenol-F epoxy resin with (meth)acrylic acid.

The weight-average molecular weight of the oligomer generally is in the rage of 300 to 5,000, preferably in the rage of 300 to 3,000. The oligomer is preferably contained in the mixture for forming the adhesive layer in the amount of 20 to 80% by weight, especially 20 to 70% by weight.

The acrylate monomers and methacrylate monomers reserve to improve the adhesion property and control the elastic modulus, and further to adjust the viscosity of the coating liquid (generally the mixture) for forming the adhesive layer. Though the amount of the monomer is appropriately determined depending on the kind of the oligomer used, the monomer is preferably contained in the mixture for the adhesive layer in the amount of 10 to 80% by weight, especially 20 to 70% by weight. The molecular weight of the monomer generally is in the range of 50 to 500, especially in the range of 50 to 300.

Examples of the (meth)acrylate monomers include monofunctional monomers such as 2-hydroxyethyl (meth)acrylate, 2-hydroxyropyl (meth)acrylate, 4-hydroxybutyl (meth)acrylate, 2-ethylhexylpolyethoxy (meth)acrylate, benzyl (meth) acrylate, isobornyl (meth)acrylate, phenyloxyethyl (meth) acrylate, tricyclodecane mono(meth)acrylate, dicyclopentenyloxyethyl (meth)acrylate, tetrahydrofurfuryl (meth)acrylate, morpholine (meth)acrylate ((meth)acryloyl-morpholine), N-vinylcaprolactam, 2-hydroxy-3-phenyloxypropyl (meth)acrylate, and o-phenylphenyloxyethyl (meth) acrylate;

difunctional monomers such as neopentylglycol di(meth) acrylate, neopentyl glycol dipropoxy di(meth)acrylate, neopentyl glycol hydroxypivalate di(meth)acrylate, dimethyloltricyclodecane di(meth)acrylate, 1,6-hexanediol di(meth) acrylate, and nonanediol di(meth)acrylate;

polyfunctional monomers such as trimethylolpropane tri (meth)acrylate, pentaerythritol tri(meth)acrylate, pentaerythritol tetra(meth)acrylate, dipentaerythritol hexa(meth)acrylate, tris[(meth)acryloxyethyl]isocyanurate and ditrimethylolpropane tetra(meth)acrylate.

Preferred examples of the (meth)acrylate monomers include monofunctional acrylate monomers such as morpholine acrylate, phenyloxy acrylate, tetrahydrofurfuryl acrylate, 2-hydroxyethyl acrylate, isobonyl acrylate, and phenylglycidyl ether epoxy acrylate;

difunctional acrylate monomers such as 1,6-hexanediol diacrylate, dimethyloltricyclodecane diacrylate, and neopentylglycol diacrylate;

polyfunctional acrylate monomers such as pentaerythritol triacrylate, pentaerythritol pentaacrylate, and dipentaerythritol hexaacrylate; and methacrylate monomers corresponding to the above-mentioned acrylate monomers.

In the invention, apart from the oligomers and monomers, any oligomers and monomers conventionally used in UV-curable resin may be employed.

The composition (formulation) consisting of the materials for forming the adhesive layer mainly composed of the mixture (generally oligomer and monomer) is generally light-cured using a photosensitive initiator or heat-cured using an organic peroxide. It is preferred to light-cure the composition.

Further in order to obtain the specific work of the adhesive layer in elastic deformation, it is preferred to use the thermoplastic elastomer for adjusting a value of the work in elastic deformation. Examples of the thermoplastic elastomer include polystyrene block copolymers such as styrene-butadiene-styrene block copolymer (SBS), styrene-isoprene-styrene block copolymer (SIS), styrene-ethylene-butadiene-styrene block copolymer (SEBS), and styrene-propylene-butadiene-styrene block copolymer (SPBS). Especially preferred is SEBS. The polystyrene block copolymer is prepared by, for example, polymerizing each of styrene and butadiene and the like in order in the presence of alkyl-lithium catalyst. The SEBS is generally obtained by hydrogenation of SBS. The thermoplastic elastomer is preferably used in the amount of 50 to 800% by weight, especially 20 to 500% by weight based on the total amount of the compounds having ester group.

In case the compound having ester group of the invention (preferably a mixture of (meth)acrylate oligomers and monomers) is cured by heat, an organic peroxide is employed.

As the organic peroxide, any materials that can be decomposed at a temperature of not less than 70° C. to generate radical(s) can be employed. The organic peroxide is selected in the consideration of film-forming temperature, conditions for preparing the composition, curing temperature, heat resistance of body to be bonded and storage stability. Especially, preferred are those having a decomposition temperature of not less than 50° C. in a half-life of 10 hours.

Examples of the organic peroxide include 2,5-dimethylhexane-2,5-dihydroperoxide, 2,5-dimethyl-2,5-(t-butylperoxy)hexyne-3, di-t-butylperoxide, t-butylcumyl peroxide, 2,5-dimethyl-2,5-di(t-butylperoxy)hexane, dicumyl peroxide, $\alpha,\alpha'$-bis(t-butylperoxyisopropyl)benzene, n-butyl-4,4-bis(t-butylperoxy)valerate, 1,1-bis(t-butylperoxy)cyclohexane, 1,1-bis(t-butylperoxy)-3,3,5-trimethylcyclohexane, t-butylperoxybenzoate, benzoyl peroxide, t-butylperoxyacetate, methyl ethyl ketone peroxide, 2,5-dimethylhexyl-2,5-bisperoxybenzoate, butyl hydroperoxide, p-menthane hydroperoxide, p-chlorobenzoyl peroxide, hydroxyheptyl peroxide, chlorohexanone peroxide, octanoyl peroxide, decanoyl peroxide, lauroyl peroxide, cumyl peroxyoctoate, succinic acid peroxide, acetyl peroxide, t-butylperoxy(2-ethylhexanoate), m-toluoyl peroxide, t-butylperoxyisobutylate and 2,4-dichlorobenzoyl peroxide. The organic peroxide can be used singly, or in combination of two or more kinds. The content of the organic peroxide is preferably in the range of 0.1 to 10 weight % based on the amount of the compound having ester group.

In case the compound having ester group of the invention (preferably a mixture of (meth)acrylate oligomers and monomers) is cured by light, photosensitizer (photopolymerization initiator) is used instead of the organic peroxide, and it is generally used in an amount of 0.1 to 10.0 weight % based on the compound having ester group.

As the photopolymerization initiator, known any photopolymerization initiators can be used. However, those showing good storage stability after the preparation are preferred. Examples of the photopolymerization initiator include conventional radical photopolymerization initiators, for example, hydrogen drawing type initiators such as benzophenone, methyl o-benzoyl benzoate, 4-benzoyl-4'-methyldiphenylsulphide, isopropylthioxanthone, diethylthioxanthone, and methyl 4-(diethylamino)benzoate; intermolecular cleavage type initiators such as benzoin ether, benzoin isopropyl ether, benzoin dimethyl ketal; $\alpha$-hydroxyalkylphenone type initiators such as 2-hydroxy-2-methyl-1-phenyl-propane-1-on, 1-hydroxycyclohexyl phenyl ketone, alkylphenyl glyoxylate, diethoxyacetophenone; $\alpha$-aminoalkylphenon type initiators such as 2-methyl-1-[4-(methylthio)phenyl]-2-morphorino-propanon-1 and 2-bemzyl-2-dimethylamino-1-(4-morphorinophenyl)butanone-1; and acylphosphine oxides. The photopolymerization initiator can be used singly, or in combination of two or more kinds.

The adhesive layer of the invention generally contain a silane coupling agent. Examples of the silane coupling agent include vinylethoxysilane, vinyltris($\beta$-methoxyethoxy)silane, $\gamma$-(methacryloxypropyl)trimethoxysilane, vinyltriacetoxysilane, $\gamma$-glycidoxypropyltrimethoxysilane, $\gamma$-glycidoxypropyltriethoxysilane, $\beta$-(3,4-epoxycyclohexyl) ethyltrimethoxysilane, vinyltrichlorosilane, $\gamma$-mercaptopropylmethoxysilane, $\gamma$-aminopropyltriethoxysilane, N-$\beta$-(aminoethyl)-$\gamma$-aminopropyltrimethoxysilane. Preferred is $\gamma$-(methacryloxypropyl)trimethoxysilane. The silane coupling agent can be used singly, or in combination of two or more kinds. The content of the silane coupling agent is preferably in the range of 0.01 to 10 weight % based on the amount of the compound having ester group.

Further, the adhesive layer can contain an epoxy group-containing compound as an adhesion-promoting agent. Examples of the epoxy group-containing compound include triglycidyl tris(2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol(ethyleneoxy)$_5$glycidyl ether, p-tert-butylphenyl glycidyl ether, diglycidyl adipate, diglycidyl phthalate, glycidyl methacrylate and butyl glycidyl ether. The agent can be used singly, or in combination of two or more kinds. The content of the agent is preferably in the range of 0.1 to 20 weight % based on the amount of the compound having ester group.

The adhesive layer can contain crosslinking auxiliary, tackifier, plasticizer, UV-absorber and/or antioxidant for improvement or adjustment of various properties of the layer (e.g., mechanical strength, adhesion property (bonding strength), optical characteristics such as transparency, heat resistance, light resistance, crosslinking rate). Further, the adhesive layer can contain acryloxy group-containing compounds, methacryloxy group-containing compounds and/or allyl group-containing compounds other than the above-mentioned compounds having ester group for improvement of mechanical strength.

Examples of the acryloxy and methacryloxy group containing compounds include generally derivatives of acrylic acid or methacrylic acid, such as esters and amides of acrylic acid or methacrylic acid. Examples of the ester residue include linear alkyl groups (e.g., methyl, ethyl, dodecyl, stearyl and lauryl), a cyclohexyl group, a tetrahydrofurfuryl group, an aminoethyl group, a 2-hydroxyethyl group, a 3-hydroxypropyl group, a 3-chloro-2-hydroxypropyl group. Further, the esters include esters of acrylic acid or methacrylic acid with polyhydric alcohol such as ethylene glycol, triethylene glycol, polypropylene glycol, polyethylene glycol, trimethylol propane or pentaerythritol.

Example of the amide includes diacetone acrylamide.

Examples of polyfunctional compounds (crosslinking auxiliaries) include esters of plural acrylic acids or methacrylic acids with polyhydric alcohol such as glycerol, trimethylol propane or pentaerythritol; and further triallyl cyanurate, triallyl isocyanurate, diallyl phthalate, diallyl isophthalate and diallyl maleate.

The above compound containing acryloxy and the like can be used singly, or in combination of two or more kinds. The content of the compound is preferably in the range of 0.1 to 50 weight %, especially 0.5 to 30 weight % based on the polyolefin resin. When the compound is used in an amount of more than 50 weight %, there are some cases where the preparation of a coating liquid for forming the adhesive layer comes to difficult or the coating properties of the liquid becomes poor. The addition of the compound of less than 0.1 weight % does not bring about effect by the addition.

Further the adhesive layer can contain a hydrocarbon resin for improving processing properties such as laminating properties. The hydrocarbon resin may be either natural resin or synthetic resin. Examples of the natural resins preferably include rosins, rosin derivatives and terpene resins. Examples of the rosins include gum resins, tall oil resins, wood resins. Examples of the rosin derivatives include hydrogenated rosins, disproportionated rosins, polymerized rosins, esterificated rosins, and metal salts of rosins. Examples of the terpene resins include α-pinene resins, β-pinene resins, and terpene phenol resins. Moreover, as the natural resin, dammar, copal, shellac can be also used. Examples of the synthetic resins preferably include petroleum resins, phenol resins, and xylene resins. Examples of the petroleum resins include aliphatic petroleum resins, aromatic petroleum resins, cycoaliphatic petroleum resins, copolymer type petroleum resins, hydrogenated petroleum resins, pure monomer type petroleum resins, and coumarone-indene resins. Examples of the phenol resins include alkylphenol resins and modified phenol resins. Examples of the xylene resins include xylene resins and modified xylene resins. The content of the hydrocarbon resin, which can be appropriately selected, is preferably in the range of 1 to 200 weight %, especially 5 to 150 weight % based on the amount of the compound having ester group.

The transparent conductive film of the invention can be generally obtained by bonding the second polymer film having the hardcoat layer formed thereon to the first polymer film having the transparent conductive layer formed thereon using the above crosslinkable adhesive layer comprising the compound having ester group. The bonding (laminating) may be carried out by applying the materials for forming the adhesive layer onto the surface having no layer of the first polymer film, for example using a knife coater, roll coater or bar coater, if necessary heating the coated (applied) layer, and bonding the second polymer film to the first polymer film through the coated layer. The bonding (laminating) is generally carried out by means of calendar process, roll process, T-die extrusion process or inflation process. Otherwise, the two films and the layer can be also bonded to each other by depressing them under heating using a roll or the like.

After the bonding, the resultant bonded film is preferably subjected to a degassing treatment by pressurizing and heating and/or a degassing treatment by vacuum heating to remove gas contained in the adhesive layer. The degassing treatment by pressurizing is carried out by placing the bonded (laminated) film in a pressurizing and heating chamber such as an autoclave to remove the gas (degas). The adhesive layer of the bonded film adhesive is cured by heating or irradiation of light after the degassing.

When the curing is performed by heating, the temperature for the heating, depending on kinds of the used organic peroxides, generally is in the range of 70 to 150° C., preferably 70 to 130° C., for 10 sec. to 120 min., preferably 20 sec. to 60 min. When the curing is performed by irradiation of light, a large number of sources emitting light in wavelength of ultraviolet to visible ray light can be adopted as a light source. Example of the light sources include super high-pressure, high-pressure and low-pressure mercury lamps, a chemical lamp, a xenon lamp, a halogen lamp, a mercury halogen lamp, a carbon arc lamp, and an incandescent electric lamp, and laser beam. The irradiation (exposing) time is generally in the range of a few seconds to a few minutes, depending upon kinds of the lamp and strength of light. To promote the curing, the laminate (bonded film) may be heated beforehand to a temperature of 40 to 120° C., and then the heated laminate may be exposed to ultraviolet ray.

When the polymer films are bonded to by the adhesive layer, the pressure can be set appropriately. The pressure is generally 0 to 50 kg/cm$^2$, preferably 0 to 30 kg/cm$^2$. The thickness of the adhesive layer formed as above is generally in the range of 5 to 100 μm.

The transparent conductive plate of the invention can be also obtained in the same manner as above. In more detail, the transparent conductive plate can be obtained by applying the materials for forming the adhesive layer onto the surface of the transparent substrate, for example using a knife coater, roll coater or bar coater, if necessary heating the coated layer, and bonding the transparent substrate and the polymer film each other through the coated layer. Then, the adhesive layer of the bonded film is cured in the same manner as above.

In case the hardcoat layer is formed on the (second) polymer film, after the laminate is prepared as above without formation of a hardcoat lyer, the hardcoat layer may be formed on the polymer film of the laminate.

A protective layer can be provided on the transparent conductive thin layer of the invention. The protective layer preferably is a thin layer comprising, for example, $SiC_x$, $SiC_xO_y$, $SiC_xN_y$, $SiC_xO_yN_z$, in which x, y, z are an integer.

The thickness of the protective layer is appropriately set depending upon materials used for forming the layer and light transmission and durability required to the transparent conductive film. When the thickness of the protective layer is excessively reduced, the protective effect by the formation of the layer cannot be sufficiently obtained. The excessively increased thickness brings about the reduction of transparency or conductivity, and further the thickness of the transparent conductive film is increased per se. Thus the thickness of the protective layer is preferably in the range of 1 to 1,000 nm, especially in the range of 1 to 100 nm. The protective layer may be formed from a polymer.

In the transparent conductive film, the hardcoat layer 11, 21 is formed on the reverse side (not facing adhesive layer 13) of the second polymer film 12 or the surface of the polymer film 22 as mentioned above to protect the polymer film from the force (load) by pen or fingertip input. The hardcoat layer can be formed using conventional UV-curable resin or thermosetting silane. For instance, the hardcoat layer is formed from the resin such as acrylic resin, epoxy resin, urethane resin or silicone resin. The thickness of the hardcoat layer generally is in the range of 1 to 50 μm.

Further the transparent conductive thin layer may be formed directly on the first polymer film or the transparent substrate, or formed through the undercoat layer on the polymer film or the transparent substrate. The provision of the undercoat layer enhances the adhesion property between the transparent conductive thin layer and the polymer film or substrate to prevent the peeling of the transparent conductive thin layer.

The undercoat layer can be formed by vapor deposition process using the materials used for forming the protective layer. Otherwise, as the undercoat layer, a layer of resin such as acrylic resin, urethane resin or epoxy resin, or a layer of hydrolysis product of an organic silicon compound can be formed by coating. The undercoat layer can be formed by applying a coating liquid having a desired composition onto the polymer film using a coater such as bar coater.

The polymer film can be subjected to an appropriate surface treatment such as a plasma treatment, corona treatment or solvent-washing treatment according to a conventional method, before the undercoat layer is formed on the polymer film, in order to enhance the bonding strength of the thin layer to be formed.

Further, a surface of the hardcoat layer can be processed by an antiglare processing, or an AR treatment in order to enhance the optical characteristics of the transparent conductive film.

Furthermore, an antireflection layer mentioned later can be provided on the hardcoat layer.

On the hardcoat layer, an antireflection layer can be formed.

The antireflection layer includes laminates having the following structures:

(a) a laminate of two layers in total composed of a high refractive index-transparent thin layer and a low refractive index-transparent thin layer;

(b) a laminate of four layers in total that two high refractive index-transparent thin layers and two low refractive index-transparent thin layers are alternately provided one by one;

(c) a laminate of three layers in total composed of an intermediate refractive index-transparent thin layer, a low refractive index-transparent thin layer and a high refractive index-transparent thin layer which are laminated in this order;

(d) a laminate of six layers in total that three high refractive index-transparent thin layers and three low refractive index-transparent thin layers are alternately provided one by one.

Examples of materials of the above high or intermediate refractive index-transparent thin layer include ITO (Indium Tin Oxide), ZnO, Al-doped ZnO, $TiO_2$, $SnO_2$, and ZrO whose films generally have refractive index of 1.8 or more.

Examples of materials of the above low or intermediate refractive index-transparent thin layer include $SiO_2$, $MgF_2$, $Al_2O_3$, acrylic resin, urethane resin, silicone resin and fluorine resin whose films generally have refractive index of 1.6 or less. Otherwise, the thin layer can be obtained by coating of a paint (having refractive index of 1.5 or less) comprising an organic binder and low refractive index-inorganic powders mentioned above.

The thicknesses of the low, intermediate and high refractive index-transparent thin layers are appropriately set depending upon the number of layers of the laminate and materials used in the layers and the central wavelength so as to lower the reflectivity in a visible ray region by interference of light.

For example, in the case of the four-layered antireflection layer, it is preferred that a first high refractive index-thin layer provided on the transparent plate (hardcoat layer) side has thickness of 5 to 50 nm, a second low refractive index-thin layer has thickness of 5 to 50 nm, a third high refractive index-thin layer has thickness of 50 to 100 nm, and a forth low refractive index-thin layer has thickness of 50 to 150 nm.

Further, an anti-contamination layer may be formed on the antireflection layer to improve resistance to contamination. Examples of the anti-contamination layer include a fluorine resin thin layer and a silicone resin thin layer having the thickness of 1 to 1,000 nm.

Materials of the spacers 20, 30 include thermosetting resin, light-curable resin. The spacers are formed by, for example, printing the above resin on the transparent conductive thin layer.

The transparent conductive layer of the invention can be advantageously employed in a transparent switching device, and other optical transparent conductive films apart from the upper electrode of the touch panel. Further the transparent conductive plate of the invention can be advantageously employed in a transparent switching device, and other optical transparent conductive films apart from the lower electrode of the touch panel.

EXAMPLE

Example 1

Materials for Forming the Adhesive Layer (Formulation)

| | |
|---|---|
| Urethane acrylate (UV2000B, available from Nippon Synthetic Chemical Ind.) | 50 wt. parts |
| 2-Hydroxyethyl acrylate | 25 wt. parts |
| Phenyl glycidyl ether epoxy acrylate | 25 wt. parts |
| 1-Hydroxycyclohexyl phenyl ketone | 2 wt. parts |

The above materials were homogeneously stirred to prepare a mixture. The mixture was applied onto a PET film having thickness of 100 μm (for the second polymer film) using a knife coater to form a coated (applied) layer of 25 μm thickness, and the coated (applied) layer was faced to the reverse side of a PET film having thickness of 381 μm (for the first polymer film) provided with an ITO transparent conductive thin layer (thickness: 30 nm) thereon and these films were bonded.

The coated layer was exposed to ultraviolet light radiated from a metal halide lamp (200 mW/cm$^2$) through the PET film of 100 μm thickness for five seconds to cure. Thereby an adhesive layer was formed to bond the two PET films.

Further, on the surface of PET film having thickness of 100 μm (for the second polymer film), three superposed layers composed of a hardcoat layer (thickness: 5 μm) of UV-curable acrylic resin, a cured layer (thickness: 80 nm) of ITO-containing UV-curable acrylic resin and a cured layer (thickness: 100 nm) of UV-curable acrylic resin, were formed in this order, to obtain a transparent conductive film for an upper electrode.

Comparison Example 1

Pressure-Sensitive Adhesive
The following materials were polymerized in ethyl acetate to prepare a polymer:

| | |
|---|---|
| Butyl acrylate | 90 wt. parts |
| Acrylic acid | 5 wt. parts |
| 2-Hydroxyethyl acrylate | 5 wt. parts |

One weight part of an isocyanate compound (tolylene diisocyanate) was added to 100 weight parts of the resultant polymer to react with each other whereby a pressure-sensitive adhesive was prepared.

The procedure in Example 1 was repeated except for using the pressure-sensitive adhesive instead of the mixture of the materials for forming the adhesive layer to bond the two polymer films by heating, to prepare a transparent conductive film.

Comparison Example 2

Materials for Forming the Adhesive Layer (Formulation)

| | |
|---|---|
| Urethane acrylate (UV3000B, available from Nippon Synthetic Chemical Ind.) | 50 wt. parts |
| Isobonyl acrylate | 25 wt. parts |
| Neopentyl glycol acrylate | 25 wt. parts |
| 1-Hydroxycyclohexyl phenyl ketone | 2 wt. parts |

The procedure in Example 1 was repeated except for using the above-mentioned materials as the materials for forming the adhesive layer to prepare a transparent conductive film.

Comparison Example 3

Materials for Forming the Adhesive Layer (Formulation)

| | |
|---|---|
| Ethylene vinyl acetate copolymer (EV40Y, available from Du Pont-Mitsui Polychemicals Co., Ltd.) | 100 wt. parts |
| Phenoxydiethyleneglycol acrylate | 25 wt. parts |
| 1-Hydroxycyclohexyl phenyl ketone | 2 wt. parts |

The procedure in Example 1 was repeated except for using the above-mentioned materials as the materials for forming the adhesive layer and applying a mixture obtained by dissolving the materials in toluene to the polymer film to prepare a transparent conductive film.

Example 2

Materials for Forming the Adhesive Layer (Formulation)

| | |
|---|---|
| Urethane acrylate (UV2000B, available from Nippon Synthetic Chemical Ind.) | 50 wt. parts |
| Phenyl glycidyl ether epoxy acrylate (R-128H, available from Nippon Kayak) | 25 wt. parts |
| Phenoxyethyl acrylate (R-561, available from Nippon Kayak) | 25 wt. parts |
| 1-Hydroxycyclohexyl phenyl ketone (Irgcure 184, available from Ciba Specialty Chemicals Inc.) | 1 wt. parts |

The procedure in Example 1 was repeated except for using the above-mentioned materials as the materials for forming the adhesive layer to prepare a transparent conductive film for an upper electrode.

Example 3

Materials for Forming the Adhesive Layer (Formulation)

| | |
|---|---|
| Urethane acrylate (UV2000B, available from Nippon Synthetic Chemical Ind). | 50 wt. parts |
| Phenyl glycidyl ether epoxy acrylate (R-128H, available from Nippon Kayak) | 25 wt. parts |
| Tetrahydrofurfuryl acrylate (THF-A, available from KYOEISYA CHEMICAL Co., LYD.) | 25 wt. parts |
| 1-Hydroxycyclohexyl phenyl ketone (Irgcure 184, available from Ciba Specialty Chemicals Inc.) | 1 wt. parts |

The procedure in Example 1 was repeated except for using the above-mentioned materials as the materials for forming the adhesive layer to prepare a transparent conductive film for an upper electrode.

Example 4

Materials for Forming the Adhesive Layer (Formulation)

| | |
|---|---|
| Urethane acrylate (UV2000B, available from Nippon Synthetic Chemical Ind.) | 40 wt. parts |
| Two-functional bis-A type epoxy acrylate oligomer (R-381, available from Nippon Kayak) | 20 wt. parts |
| Phenoxyethyl acrylate (R-561, available from Nippon Kayak) | 40 wt. parts |
| 1-Hydroxycyclohexyl phenyl ketone (Irgcure 184, available from Ciba Specialty Chemicals Inc.) | 1 wt. parts |

The procedure in Example 1 was repeated except for using the above-mentioned materials as the materials for forming the adhesive layer to prepare a transparent conductive film for an upper electrode.

Example 5

Materials for Forming the Adhesive Layer (Formulation)

| | |
|---|---|
| Urethane acrylate (UV2000B, available from Nippon Synthetic Chemical Ind.) | 50 wt. parts |
| Morphorin acrylate (RM-1001, available from Nippon Kayak) | 15 wt. parts |
| Phenoxyethyl acrylate (R-561, available from Nippon Kayak) | 35 wt. parts |
| 1-Hydroxycyclohexyl phenyl ketone (Irgcure 184, available from Ciba Specialty Chemicals Inc.) | 1 wt. parts |

The procedure in Example 1 was repeated except for using the above-mentioned materials as the materials for forming the adhesive layer to prepare a transparent conductive film for an upper electrode.

Example 6

Materials for Forming the Adhesive Layer (Formulation)

| | |
|---|---|
| Styrene-ethylene-butylene-styrene block copolymer (KRAYTON G-1657, available from KRAYTON Polymers Japan) | 80 wt. parts |
| Morphorin acrylate (RM-1001, available from Nippon Kayak) | 10 wt. parts |
| Phenoxyethyl acrylate (R-561, available from Nippon Kayak) | 10 wt. parts |
| 1-Hydroxycyclohexyl phenyl ketone (Irgcure 184, available from Ciba Specialty Chemicals Inc.) | 1 wt. parts |
| Toluene | 400 wt. parts |

The procedure in Example 1 was repeated except for using the above-mentioned materials as the materials for forming the adhesive layer and applying a mixture of the materials to the surface of PET film having thickness of 100 μm (for the second polymer film) using a knife coater and drying to evaporate the solvent (adhesive layer of 25 μm thickness) to prepare a transparent conductive film for an upper electrode.

Figure 1:
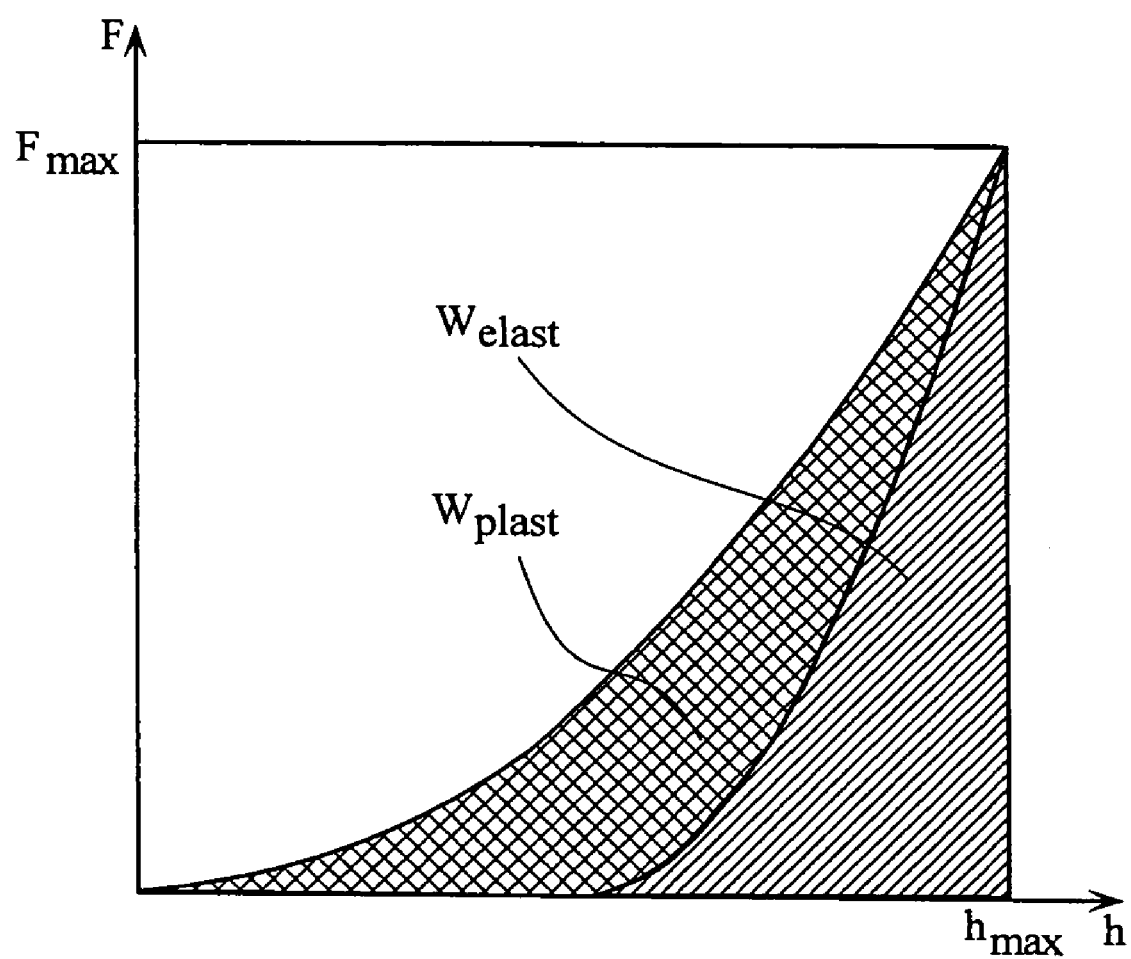
FIG. 1 is a curve graph showing the relationship between the force (F) and the depressed depth (h) used for determining the work in elastic deformation.

Methods for Evaluation of Transparent Conductive Film (1) Work of the Adhesive Layer in Elastic Deformation The adhesive layers (thickness: 25 μm) are formed on a glass plate in the same manner as in Examples and Comparison Examples described above to obtain test pieces. The surface of the test piece is depressed using a supermicro penetrometer (Fischer Scope H100, available from Helmut Fischer Company), under the conditions of the force (load) to the test film of 3.0 mN, the time for application of the force of 10 sec., and the time for removal of the force of 10 sec. after the application of the force. Thus, the work in elastic deformation is obtained from a curve graph showing the relationship between the force (F) and the depressed depth (h) as shown in FIG. 1. The work in elastic deformation is represented by the formula:

$$\eta_{IT} = W_{elast}/W_{total} \times 100$$

(2) Elastic Modulus of the Adhesive Layer

Adhesion layers were formed in the form of cylinder having a diameter of 12 mm and a thickness of 2 mm according to the procedures of Examples and Comparison Examples to prepare test pieces. The test pieces each were subjected to the measurement of elastic modulus using an elastic modulus measuring apparatus (RDS-II, available from Rheometrics) under the conditions of strain of 1% and frequency of 1 Hz.

(3) Sliding (Grinding) Test

A transparent conductive thin layer was formed on a glass plate having thickness of 2 mm to prepare a transparent conductive plate as a lower electrode of a touch panel as described above. The transparent conductive layer as an upper electrode obtained above was placed on the resultant transparent conductive plate and thereafter the following sliding test was performed.

An input pen (pen made of polyacetal; tip end: 0.8 mmR) carrying load of 500 g thereon was repeatedly slide 100,000 times on the hardcoat layer (reverse side of the transparent conductive layer) of the film whereby a sliding test was carried out.

After the test, (1) the formed depression was measured with a needle-contact type displacement apparatus and (2) change (linearity) of the electrical resistivity was measured.

(4) Durability Test

The test pieces were subjected to environmental tests (at 80° C. for 500 hours, and at 60° C., 90RH % for 500 hours) and thereafter appearances of the test pieces were observed.

The obtained results are shown in Table 1 and Table 2.

TABLE 1

| | Example 1 | Co. Ex. 1 | Co. Ex. 2 | Co. Ex. 3 |
|---|---|---|---|---|
| Work in elastic deformation (%) | 88.9 | 25.3 | 35.4 | 52.13 |
| Elastic modulus (Pa) | $8 \times 10^5$ | $5 \times 10^3$ | $5 \times 10^7$ | $7 \times 10^5$ |
| Depression after Sliding test (μm) | 0.1 | 2.5 | 0.1 | 3.5 |
| Linearity after grinding test (%) | 0.5 | 0.6 | 12 | 0.5 |
| Durability (80° C., 500 hours) | Good appearance | Occurrence of bubbles | Occurrence of warpage | Good appearance |
| Durability (60° C., 90 RH %, 500 hours) | Good appearance | Occurrence of peeling | Occurrence of warpage | Good appearance |

TABLE 2

| | Example 2 | Example 3 | Example 4 | Example 5 | Example 6 |
|---|---|---|---|---|---|
| Work in elastic deformation (%) | 89.7 | 85.5 | 87.3 | 82.5 | 80.0 |
| Elastic modulus (Pa) | $8.09 \times 10^5$ | $8.72 \times 10^5$ | $8.56 \times 10^5$ | $1.04 \times 10^6$ | $1.03 \times 10^6$ |
| Depression after Sliding test (μm) | 0.1 | 0.6 | 0.6 | 0.7 | 0.1 |
| Linearity after grinding test (%) | 0.3 | 0.3 | 0.5 | 0.4 | 0.4 |
| Durability (80° C. for 500 hours) | Good appearance | Good appearance | Good appearance | Good appearance | Good appearance |
| Durability (60° C., 90 RH %, 500 hours) | Good appearance | Good appearance | Good appearance | Good appearance | Good appearance |

Tables 1 and 2 show that the transparent conductive films prepared by using the adhesive layer having the specific work in elastic deformation according to the invention are free from occurrence of depression and deterioration of electrical characteristics and further show excellent durability when the films are used as an upper electrode of the touch panel.

In contrast, the transparent conductive films obtained in Comparison Examples show unsatisfactory results in the depression and linearity after sliding test.

The transparent conductive plate for a lower electrode having the adhesive layer of the invention are excellent in effect preventing the occurrence of depression and in durability.

[Effect of the Invention]

As mentioned above, in the transparent conductive film, the transparent conductive plate and the touch panel according to the invention, the depression is scarcely generated on the surface (of the polymer film) over the transparent conductive thin layer (upper electrode) when the surface over the transparent conductive thin layer is repeatedly pushed with a pen or fingertip, and cracks of the transparent electrode (conductive thin layer), or peeling or dropout of the transparent electrode from the polymer film is also scarcely generated whereby the excellent electric characteristics such as uniformity of electrical resistivity can be kept to show excellent durability.

DESCRIPTION OF REFERENCE NUMBER 11, 21: hardcoat layer
12: first polymer film
14: second polymer film
13, 23: adhesive layer
15, 25: undercoat layer
16, 18, 26, 28: transparent conductive thin layer
20, 30: microdot spacers
19, 29: transparent substrate

What is claimed is:

1. A transparent conductive film comprising a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film,
   wherein work of the adhesive layer in elastic deformation is not less than 60%, and the adhesive layer is a film formed by curing a compound having an ester group,
   wherein the compound having an ester group comprises:
   at least one of (meth)acrylate monomer; or
   at least one of (meth)acrylate oligomer and at least one of (meth)acrylate monomer.

2. A transparent conductive film as defined in claim 1, wherein the curing is carried out by application of light or heat.

3. A transparent conductive film as defined in claim 2, wherein the compound having ester group further comprises a photosensitive initiator for the light curing, or an organic peroxide for the heat curing.

4. A transparent conductive film as defined in claim 1, wherein the adhesive layer has elastic modulus of $1\times10^5$ to $1\times10^7$ Pa.

5. A transparent conductive film as defined in claim 1, wherein the work of the adhesive layer in elastic deformation is not less than 80%.

6. A transparent conductive film as defined in claim 1, wherein the adhesive layer contains a thermoplastic elastomer.

7. A transparent conductive film as defined in claim 1, wherein the first and second polymer films comprise polyethylene terephthalate.

8. A transparent conductive film as defined in claim 1, wherein the transparent conductive layer comprises at least one compound selected from indium oxide, tin oxide, zinc oxide, indium-doped tin oxide (ITO), antimony-doped tin oxide (ATO) and aluminum-doped zinc oxide.

9. A transparent conductive film as defined in claim 1, wherein an undercoat layer is provided between the first polymer film and the transparent conductive thin layer.

10. A transparent conductive film as defined claim 1, wherein a protective layer is provided on the transparent conductive thin layer.

11. A transparent conductive plate comprising a transparent substrate and a polymer film having a transparent conductive thin layer thereon, the transparent substrate and the polymer film being bonded each other through an adhesive layer such that a surface of the transparent substrate faces a surface having no transparent conductive thin layer of the polymer film,
   wherein work of the adhesive layer in elastic deformation is not less than 60% and the adhesive layer is a film formed by curing a compound having an ester group,
   wherein the compound having an ester group comprises:
   at least one of (meth)acrylate monomer; or
   at least one of (meth)acrylate oligomer and at least one of (meth)acrylate monomer.

12. A transparent conductive plate as defined in claim 11, wherein the curing is carried out by application of light or heat.

13. A transparent conductive plate as defined in claim 11, wherein the adhesive layer has elastic modulus of $1\times10^5$ to $1\times10^7$ Pa.

14. A transparent conductive plate as defined in claim 11, wherein the work of the adhesive layer in elastic deformation is not less than 80%.

15. A transparent conductive plate m as defined in claim 11, wherein the adhesive layer contains a thermoplastic elastomer.

16. A transparent conductive plate m as defined in claim 11, wherein the transparent substrate is a glass plate or plastic plate.

17. A touch panel comprising: an upper electrode comprising a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film,
   wherein work of the adhesive layer in elastic deformation is not less than 60%, and the adhesive layer is a film formed by curing a compound having an ester group,
   wherein the compound having an ester group comprises:
   at least one of (meth)acrylate monomer; or
   at least one of (meth)acrylate oligomer and at least one of (meth)acrylate monomer, and
   a lower electrode comprising a transparent substrate and a polymer film having a transparent conductive thin layer thereon, the transparent substrate and the polymer film being bonded each other through an adhesive layer such that a surface of the transparent substrate faces a surface having no transparent conductive thin layer of the polymer film, the upper and lower electrodes being bonded to each other through spacers such that both of the transparent conductive thin layers face with each other.

18. A touch panel comprising:

an upper electrode comprising a first polymer film having a transparent conductive thin layer thereon and a second polymer film having a hardcoat layer thereon, the first and second polymer films being bonded each other through an adhesive layer such that a surface having no transparent conductive thin layer of the first polymer film faces a surface having no hardcoat layer of the second polymer film, and a lower electrode comprising a transparent substrate and a polymer film having a transparent conductive thin layer thereon, the transparent substrate and the polymer film being bonded each other through an adhesive layer such that a surface of the transparent substrate faces a surface having no transparent conductive thin layer of the polymer film, wherein work of the adhesive layer in elastic deformation is not less than 60%, and the adhesive layer is a film formed by curing a compound having an ester group.

wherein the compound having an ester group comprises:

at least one of (meth)acrylate monomer; or at least one of (meth)acrylate oligomer and at least one of (meth)acrylate monomer, the upper and lower electrodes being bonded to each other through spacers such that both of the transparent conductive thin layers face each other.

* * * * *